United States Patent
Murata

(10) Patent No.: US 7,236,613 B2
(45) Date of Patent: Jun. 26, 2007

(54) METHODS AND APPARATUS FOR INFRARED RESOLUTION OF CLOSELY-SPACED OBJECTS

(75) Inventor: Ronald N. Murata, Seattle, WA (US)

(73) Assignee: The Boeing Company, Chicago, IL (US)

( * ) Notice: Subject to any disclaimer, the term of this patent is extended or adjusted under 35 U.S.C. 154(b) by 791 days.

(21) Appl. No.: 10/652,523

(22) Filed: Aug. 29, 2003

(65) Prior Publication Data

US 2005/0045825 A1    Mar. 3, 2005

(51) Int. Cl.
  *G06K 9/00*  (2006.01)
(52) U.S. Cl. ....................................... 382/103
(58) Field of Classification Search ................ 382/103, 382/106, 109, 276, 108
  See application file for complete search history.

(56) References Cited

U.S. PATENT DOCUMENTS

| 5,693,940 | A | 12/1997 | Botti et al. |
| 5,756,999 | A | 5/1998 | Parrish et al. |
| 5,790,250 | A | 8/1998 | Wang et al. |
| 5,818,951 | A * | 10/1998 | Schivley ..................... 382/100 |
| 6,230,108 | B1 | 5/2001 | Matsuda |
| 6,433,333 | B1 | 8/2002 | Howard |
| 6,495,827 | B2 | 12/2002 | Metcalf et al. |

\* cited by examiner

*Primary Examiner*—Matthew C. Bella
*Assistant Examiner*—Tom Y. Lu
(74) *Attorney, Agent, or Firm*—Lee & Hayes, PLLC

(57) ABSTRACT

Apparatus and methods for infrared resolution of closely-spaced objects are disclosed. In one embodiment, a method of determining a set of infrared amplitudes for a set of closely-spaced objects includes receiving an unresolved infrared image of the set of closely-spaced objects, and expressing the set of infrared amplitudes as a function of a set of positions of the closely-spaced objects. The method further includes formulating a set of simultaneous equations at least partially based on the expression between the infrared amplitudes and the set of positions of the closely-spaced objects, and solving the set of simultaneous equations for the set of infrared amplitudes. In alternate embodiments, the set of positions of the closely-spaced objects may be provided by a non-infrared position sensor, or may be iteratively-derived

80 Claims, 7 Drawing Sheets

$$A := c^{-1} \cdot v \quad (EQUATION\ (1))$$

A = INDIVIDUAL AMPLITUDES OF INFRARED CSO VECTOR "THE ANSWER"
c = CSO CORRELATION MATRIX GIVEN POSITIONS FROM VISIBLE SENSOR
v = CSO RAW DATA WEIGHTED BY POINT SPREAD FUNCTION EVALUATED AT POSITION CENTROID

METHODS AND APPARATUS FOR INFRARED RESOLUTION OF CLOSELY-SPACED OBJECTS

FIELD OF THE INVENTION

The present disclosure relates to methods and apparatus for resolution of infrared images of closely-spaced objects, and more specifically, to analytical models for resolution of infrared images of closely-spaced objects using visible and infrared sensor data.

BACKGROUND OF THE INVENTION

The detection of closely-spaced objects using infrared sensors has numerous practical applications. For example, infrared sensors may be employed in observational astronomy for the detection and tracking of stars, planets, and other extraterrestrial objects. Infrared sensors may also be used for military applications, including, for example, the long range electro-optical detection, tracking, and discrimination of targets and decoys. Similarly, infrared detection may be used in the imaging and analysis of cells and particles for medical disclosed, for example, in U.S. Pat. No. 6,495,827 issued to Metcalf et al., and U.S. Pat. No. 6,433,333 issued to Howard.

Although desirable results have been achieved using prior art infrared imaging systems, there is room for improvement. For example, prior art infrared systems typically perform an iterative curve-fitting process to match a closely-spaced object waveform having unknown amplitudes and angle variables (amplitude, azimuth and elevation for each object) to an N object blob measured by the infrared sensor. Such iterative curve-fitting processes are typically computationally intensive, thereby increasing the size and weight of the computer needed to adequately perform the intensive computations. The cost to develop and deploy such infrared imaging systems typically increases with increased weight and complexity, particularly for space-based applications that require relatively expensive launch systems to be placed in orbit. Furthermore, direct approaches to resolving closing spaced objects (CSO) that involve deploying larger aperture, heavier infrared optical systems increases system cost and sensor payload weight, particularly for space-based applications that require relatively expensive launch systems to be placed in orbit. Therefore, there is a continuing impetus to reduce the size, weight, and complexity of such infrared imaging systems and system components to reduce development and deployment costs.

SUMMARY OF THE INVENTION

The present invention is directed to methods and apparatus for infrared resolution of closely-spaced objects, and more specifically, to resolution of closely-spaced objects using combined visible and infrared sensor imagery. Apparatus and methods in accordance with the present invention may advantageously provide infrared resolution of closely-spaced objects more quickly and efficiently in comparison with prior art systems, and may further provide significant advantages in weight and overall cost in comparison with alternate infrared resolution systems.

In one embodiment, a method of determining a set of infrared amplitudes for a set of closely-spaced objects includes receiving an unresolved infrared image of the set of closely-spaced objects, and expressing the set of infrared amplitudes as a function of a set of positions of the closely-spaced objects. The method further includes formulating a set of simultaneous equations at least partially based on the expression between the infrared amplitudes and the set of positions of the closely-spaced objects, and solving the set of simultaneous equations for the set of infrared amplitudes.

In alternate embodiments, the set of positions of the closely-spaced objects may be provided by a non-infrared position sensor, or may be iteratively-derived. In further embodiments, the infrared amplitudes may be expressed as a function of a set of positions of the closely-spaced objects based on a calculus of variation technique. In still further embodiments, the infrared amplitudes may be expressed as a function of a point spread function of a sensor. Alternately, expressing the infrared amplitudes as a function of a set of positions of the closely-spaced objects may include formulating an object correlation matrix from the set of positions.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and apparatus for infrared resolution of closely-spaced objects, and more specifically, to resolution of closely-spaced objects using combined visible and infrared sensor imagery. Many specific details of certain embodiments of the invention are set forth in the following description and in FIGS. 1-7 to provide a thorough understanding of such embodiments. One skilled in the art, however, will understand that the present invention may have additional embodiments, or that the present invention may be practiced without several of the details described in the following description.

As described more fully below, embodiments of methods and apparatus in accordance with the present invention may resolve an infrared waveform of N closely-spaced objects in a direct, non-iterative computational process. Using a novel analytical relationship for modeling the infrared waveform of N closely-spaced objects, exemplary embodiments of methods and apparatus in accordance with the present invention may receive and utilize position data provided by a non-infrared (e.g. visible) position sensor, thereby reducing the number of unknown variables in the analytical model for each of the N closely-spaced objects. The infrared amplitudes of the N closely-spaced objects may then be calculated directly. Because the infrared amplitudes of the N closely-spaced objects are resolved directly rather than using an iterative curve-fitting process, the computational speed and efficiency associated with the resolution of the waveform of the N closely-spaced objects may be greatly enhanced. In alternate embodiments, even without position data from a position sensor, the computational speeds and efficiencies of methods and apparatus in accordance with the present invention may be substantially improved over the prior art because the amplitude unknowns are mapped into a function of the position unknowns. Thus, in such alternate embodiments, both the amplitude and position unknowns may be determined directly rather than iteratively.

In the following discussion, the term "closely-spaced" may variously be used to refer to objects which, from a vantage point of a sensor, either (1) fully overlap, (2) partially overlap, and (3) do not overlap at all. Thus, in one aspect, the term "closely-spaced" may be distinct and resolved, but rather, are at least partially overlapping and form a non-discrete, unresolved image or "blob". In another aspect, however, the objects may be fully overlapping, and in yet another aspect, the objects may be non-overlapping (or spaced apart) such that their images are fully distinct and resolved (or resolveable), as described more fully below.

Figure 1:
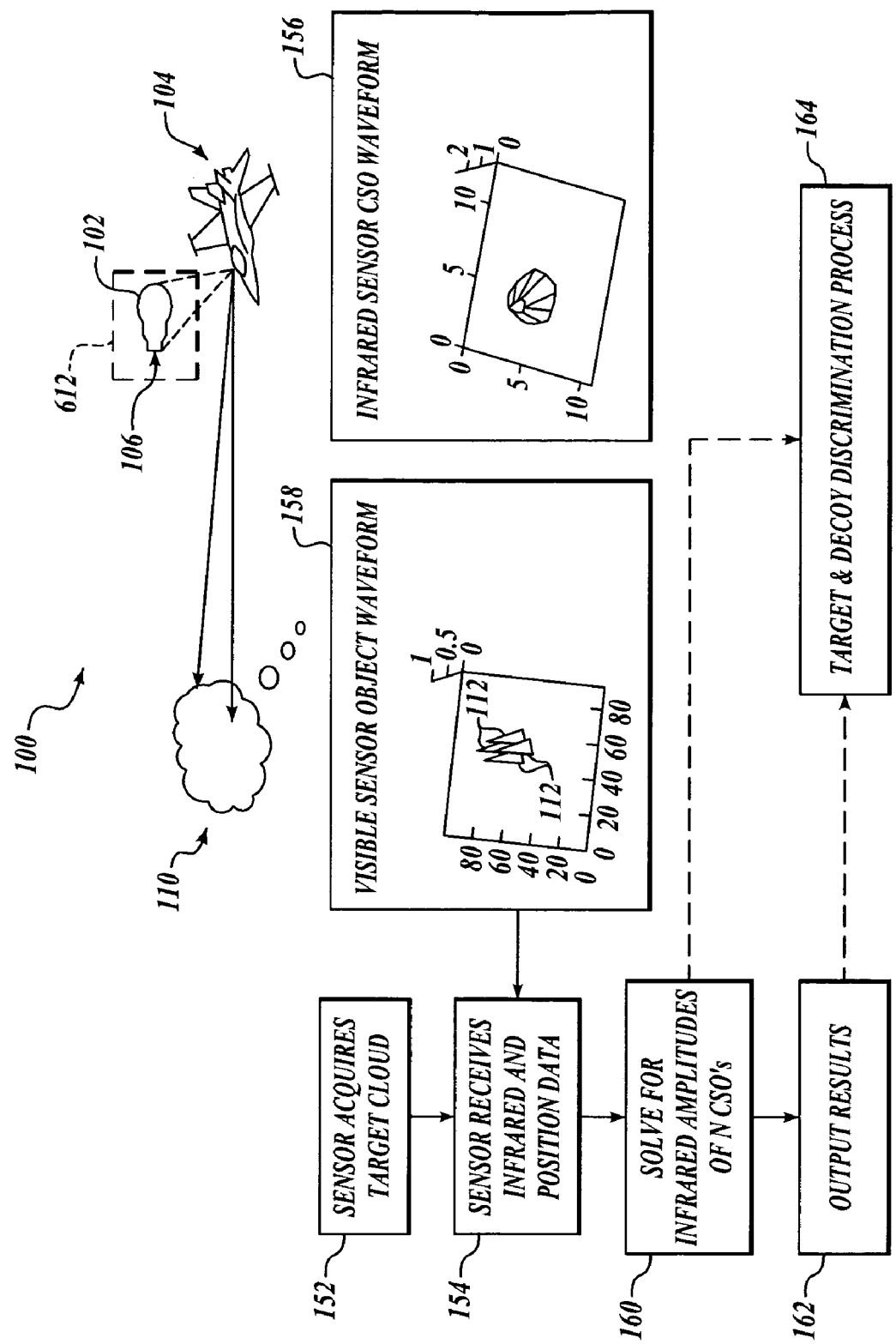
FIG. 1 is a schematic view of an imaging system in accordance with an embodiment of the present invention.

FIG. 1 is a schematic view of an imaging system 100 in accordance with an embodiment of the present invention. In this embodiment, the imaging system 100 includes a sensor 102 mounted on an aircraft 104. The sensor 102 may include both an infrared sensing portion and a non-infrared position sensing portion. An aperture 104 of the sensor 102 may be directed toward a target cloud 110 that includes one or more (e.g. N) objects 112. At least some of the objects 112 may be closely-spaced objects (CSO) 112. In a particular embodiment, the sensor 102 employs a common aperture visible position sensing portion with up to ten to twenty times improvement in diffraction-limited angular resolution compared to a long wave infrared sensing portion in order to obtain position centroids of the closely-spaced objects 112.

As further shown in FIG. 1, an overview 150 of the operation of the imaging system 100 in accordance with an embodiment of the present invention includes acquiring the target cloud 110 with the sensor 102 at a block 152. At a block 154, the sensor 102 may receive an unresolved infrared waveform 156 and an object position waveform 158 of the target cloud 110 (i.e. the N closely-spaced objects 112). In one particular embodiment, the object position waveform 158 may be provided by a sensor or sensor portion operating in the visible portion of the spectrum. In the representative embodiment shown in FIG. 1, the object position waveform 158 shows a total of four (N=4) closely-spaced objects 112 within the target cloud 110. Because the objects 112 are closely spaced, however, the infrared imaging data of the target cloud 110 appears as a single, non-discrete image (or blob) of infrared amplitude values in the unresolved infrared waveform 156. The sensor 102 may be part of a data acquisition component 612 of a system for resolving infrared images, as described more fully below with reference to FIG. 6.

With continued reference to FIG. 1, the operational overview 150 further includes resolution of the unresolved infrared waveform 156 to determine the infrared amplitudes of the N closely-spaced objects 112 at a block 160. The resolved infrared amplitudes of the N closely-spaced objects 112 may then be output at a block 162 for review and analysis. The results may also be output, for example, to a subsequent process (e.g. a target and decoy discrimination process) for further analysis and manipulation at a block 164.

Given position centroids of the N closely-spaced objects 112, the determination of the infrared amplitudes of the N closely-spaced objects 112 (block 160 of FIG. 1) in accordance with embodiments of the present invention may involve a direct, non-iterative solution of the infrared amplitudes A by solving a linear set of N simultaneous equations with N unknowns. More specifically, the mapping of N object amplitudes A as a function of N position centroids may be based on a calculus of variation technique that results in a set of N simultaneous equations in N unknown amplitudes. The simultaneous equations may be derived by minimizing the sum of squared signal (SOS) residuals formed by differencing and squaring the unresolved infrared waveform 156 with a CSO model of N unconstrained object waveforms, with each waveform comprising the triplet parameters: 1) unknown amplitude A, 2) unknown azimuth angle $Ø_x$, and 3) unknown elevation angle $Ø_y$. The N partial derivatives of SOS residuals with respect to the unknown object amplitudes A generate the N simultaneous equations for the N unknown amplitudes A. In other words, the unknown amplitudes A may be expressed directly as a function of the azimuth and elevation angles $Ø_x$, $Ø_y$. Thus, when a position sensor provides the position information for the objects 112 (i.e. azimuth and elevation angles $Ø_x$, $Ø_y$) the N unknown infrared amplitudes may be calculated using a direct, non-iterative process.

As described above, the N unknown amplitudes A of the closely-spaced objects 112 may be expressed according to the following Equation (1):

$$A = C^{-1} * V \quad (1)$$

where A is a vector of N infrared object amplitudes,
C is N×N matrix known as an Object Correlation Matrix,
−1 is the matrix inverse operator, and
V is a vector of weighted raw data, which may be expressed as V=WD, where
W is a weighting function and D is the raw data received by the sensor 102.

Figure 2:
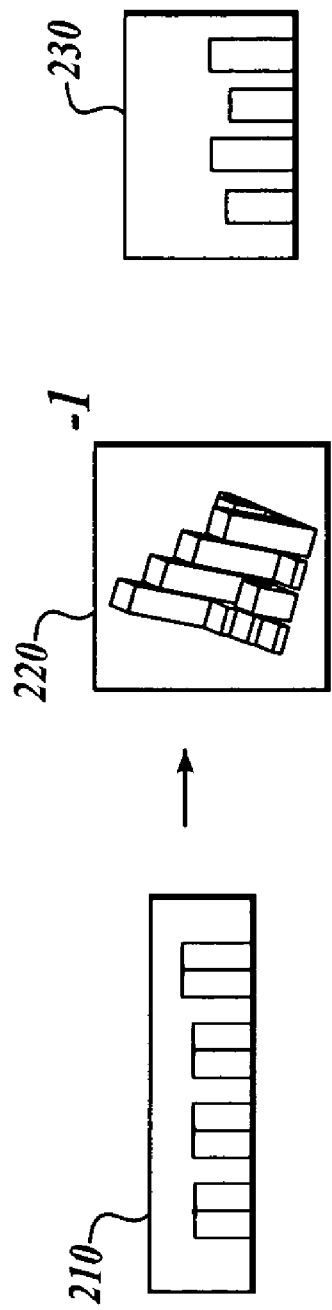
FIG. 2 is an analytic relationship for resolving an infrared waveform of N closely-spaced objects in accordance with an embodiment of the present invention.

FIG. 2 provides a visual depiction of Equation (1) for a representative example of N=4 closely-spaced objects in accordance with an embodiment of the present invention. More specifically, FIG. 2 shows a graph 210 of infrared object amplitudes A as being a function of Object Correlation Matrix C values 220 times weighted object amplitude V values 230. Thus, Equation (1) is an expression that relates the N element amplitude vector A to the inverse of the N×N Object Correlation Matrix C, which pre-multiplies a weighted N element raw data "blob" vector WD. The Object Correlation Matrix C (or simply "the C matrix") may have a physical significance as being a measure of closeness of the N objects 112 in the target cloud 110. The main diagonal of the C matrix is the auto-correlation of each of the N objects 112. The off-diagonal elements of the C matrix, such as element $C_{p,q}$, may represent a degree of overlap between object p and object q where overlap is defined as the integral of the multiplicative product of the infrared point spread functions of object p and q evaluated at the position centroid $X_p$, $Y_p$ and $X_q$, $Y_q$. In closely-spaced object data fields, the off diagonal elements of the C matrix typically may be heavily populated.

Similarly, the weighted raw data vector V may have a physical significance in that the weighting function W may be a point spread function evaluated at the object position centroid $X_p$, $Y_p$. In one embodiment, the weighting function (point spread function) W may be a known characteristic of the sensor 102. The multiplicative operation of the weighting function W and the raw data "blob" vector D signifies a capture of that portion of the "blob" vector by the infrared point spread function of each of the objects. The inverse of the C matrix operating on the weighted raw data vector V then decodes the individual object amplitudes vector A.

The analytical expression shown in Equation (1) may advantageously reduce the number of unknowns in the computational modeling of the infrared image, thereby simplifying and improving the speed and efficiency of the process of calculating the infrared amplitudes of the N closely-spaced objects 112. For example, consider a target cloud 110 having two (N=2) closely-spaced objects 112 therein. A total infrared signal level S is given by the following Equation (2):

$$S = A1*F(R1) + A2*F(R2) + \text{Noise} \qquad (2)$$

where A1, A2 are object infrared amplitudes,
R1, R2 are closely-spaced position coordinates,
F is a known Shape Function=IR Optics Point Spread Function, and
Noise is the signal noise.

Preferably, the signal to noise ratio of the infrared closely-spaced object waveform is relatively large so that the Noise value may be neglected without substantial degradation of infrared amplitude estimation accuracy. For example, in a preferred embodiment, the signal to noise ratio may be 20 or greater. The sum of squared residuals SOS may be formed with a priori knowledge of the shape function F (a known function of the sensor 102) and the six unknowns A1, A2, R1row, R1col, R2 row, and R2col. The 2 partial derivatives of SOS with respect to A1 and A2 then lead to the analytical relationship set forth in Equation (1) above. The six unknowns reduce to four position unknowns by mapping A1 and A2 into functions of position unknowns by setting the partial derivative of the sum of squared residuals SOS with respect to A1 and A2 to zero. If the four position unknowns (R1row, R1col, R2 row, R2col) are known from sensor data (e.g. visible sensor data), then the mapping of A1 and A2 using Equation (1) enables a direct computation of the infrared amplitudes A of the closely-spaced objects. In one particular embodiment, the direct computation of the infrared amplitudes A may be accomplished using a suitable computational algorithm, including, for example, a Cramer Rao or minimum variance estimate of A.

Equation (1) is particularly suitable for high speed implementation because the Object Correlation Matrix C (the C matrix) is a symmetric matrix with primary information contained in the upper or lower triangular segments of the matrix. The principal diagonal containing the autocorrelation object overlap may ensure a determinant solution. In one exemplary embodiment, a Gaussian elimination algorithm may be utilized for solution of Equation (1) for the object amplitudes A.

More specifically, an embodiment of a process for estimating a particular value c(i,j) of the Object Correlation Matrix C may include obtaining and storing the position locations of the N objects 112 in a position location vector Rj. An overlap integral PSF(Rj)*PSF(Rk) of an object pair j,k may then be calculated. If the point spread function PSF is assumed, for example, to approximate a Gaussian fit 320 (FIG. 3), then $$PSF = \exp[-(r^2+c^2)/2/s^2)] \qquad (3)$$

where r,c are the row and column pixels, respectively, and
s is a blur standard deviation width.

Figure 3:
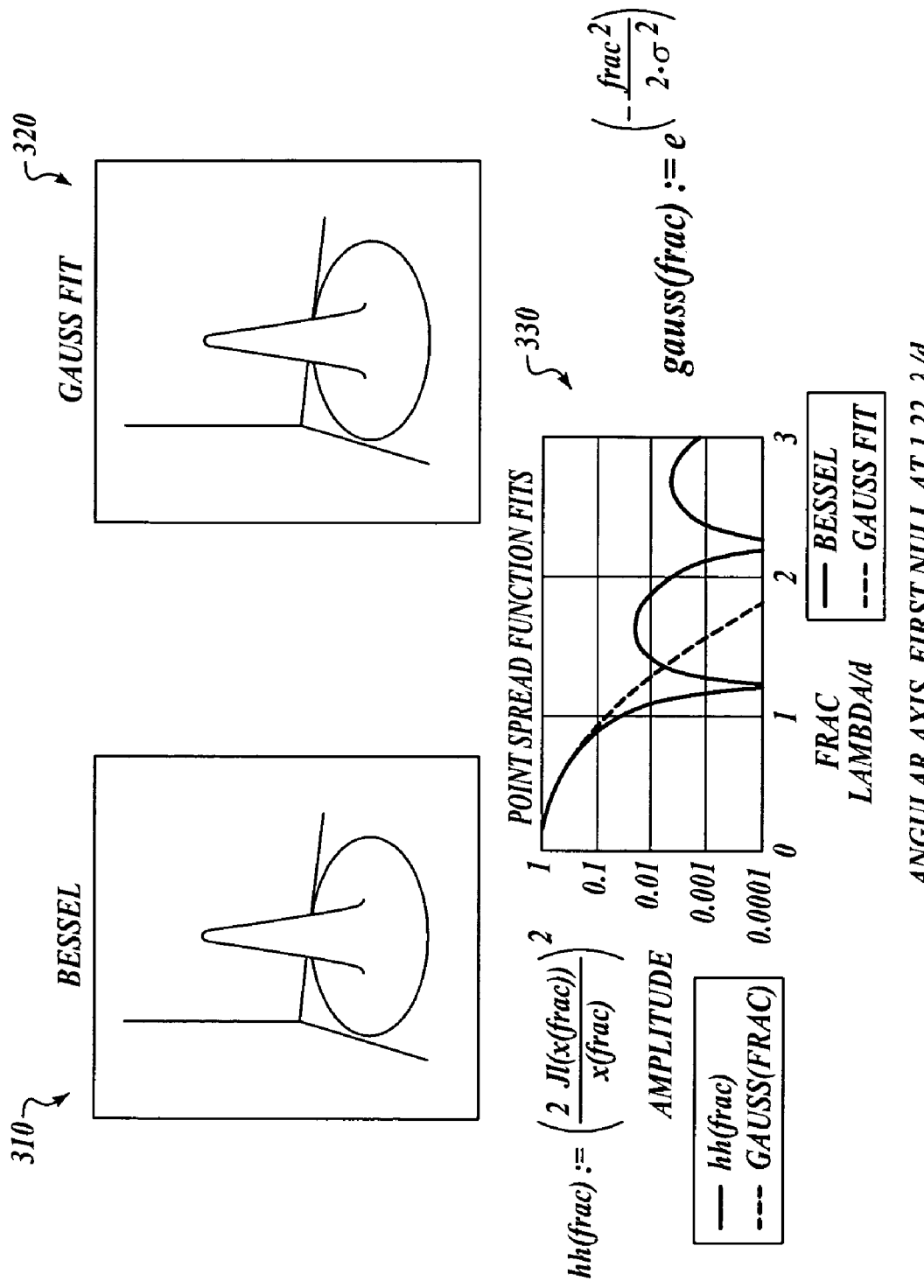
FIG. 3 shows a pair of representative point spread function models that may be employed in accordance with alternate embodiments of the present invention.

FIG. 3 shows a pair of representative point spread function PSF models that may be employed in various alternate embodiments of the present invention. Specifically, FIG. 3 shows a Bessel blur spot model 310 and a Gaussian fit 320. A comparison of the Bessel model 310 and the Gaussian fit 320 is shown in plot 330, with generally good agreement being observed for values of lambda/d less than approximately 1. Generally speaking, the resolution of an optical sensor may be proportional to the ratio of lambda/d, where lambda is the wavelength of the observed infrared signal, and d is the aperture diameter of the sensor 102.

Next, each value of the Object Correlation Matrix C may be given by the following Equation (4):

$$c(j,k) = \exp[-\tfrac{1}{4}/s^2[(rj-rk)^2 + (cj-ck)^2]] \qquad (4)$$

As mentioned above, the physical significance of the Object Correlation Matrix C is that, given the position centroids, Equation (4) describes the amplitude correlation of closely-spaced object pairs in off-diagonal elements. If there are no overlapping objects (CSOs) in the target cloud 110, then the c(j,k) values along the main diagonal of the Object Correlation Matrix C are unity, and the off-diagonal values are zero. On the other hand, if there are overlapping objects in the target cloud 110, then the off-diagonal values are non-zero, and may range from epsilon (e.g a small value within a range of approximately 0.05 to less than approximately 1) to 1 depending on the amount of overlap. In one particular aspect, an object pair j,k may be overlapping such that their respective inter-object correlation element c(j,k) in the Object Correlation Matrix C is greater than or equal to epsilon. In further aspects, when the object pair j,k is fully overlapping, the inter-object correlation element c(j,k) in the Object Correlation Matrix C has a value of zero, and when the object pair j,k is non-overlapping, the inter-object correlation element c(j,k) in the Object Correlation Matrix C has a value of one.

The weighted amplitude vector V shown in Equation (1) above may be determined using the following Equation (5):

$$Vi = \sum_{j=1}^{nx} \sum_{k=1}^{ny} blur(i,j,k) * data_{j,k} * 4 * sigma^2 \qquad (5)$$

where blur(i,j,k) is an optical blurring point spread function for object i in j,k image space,
$data_{j,k}$ is the raw infrared closely spaced object image signal received by the sensor, and
sigma is the standard deviation width of the gaussian point spread blurring function.

The blur(i,j,k) of the sensor may be modeled in a variety of ways. For example, for polychromatic infrared bands, a Gaussian blur model may represent a good fit to the peak amplitude of a Bessel function blur from a diffraction-limited long-wave infrared optical sensor.

Figure 4:
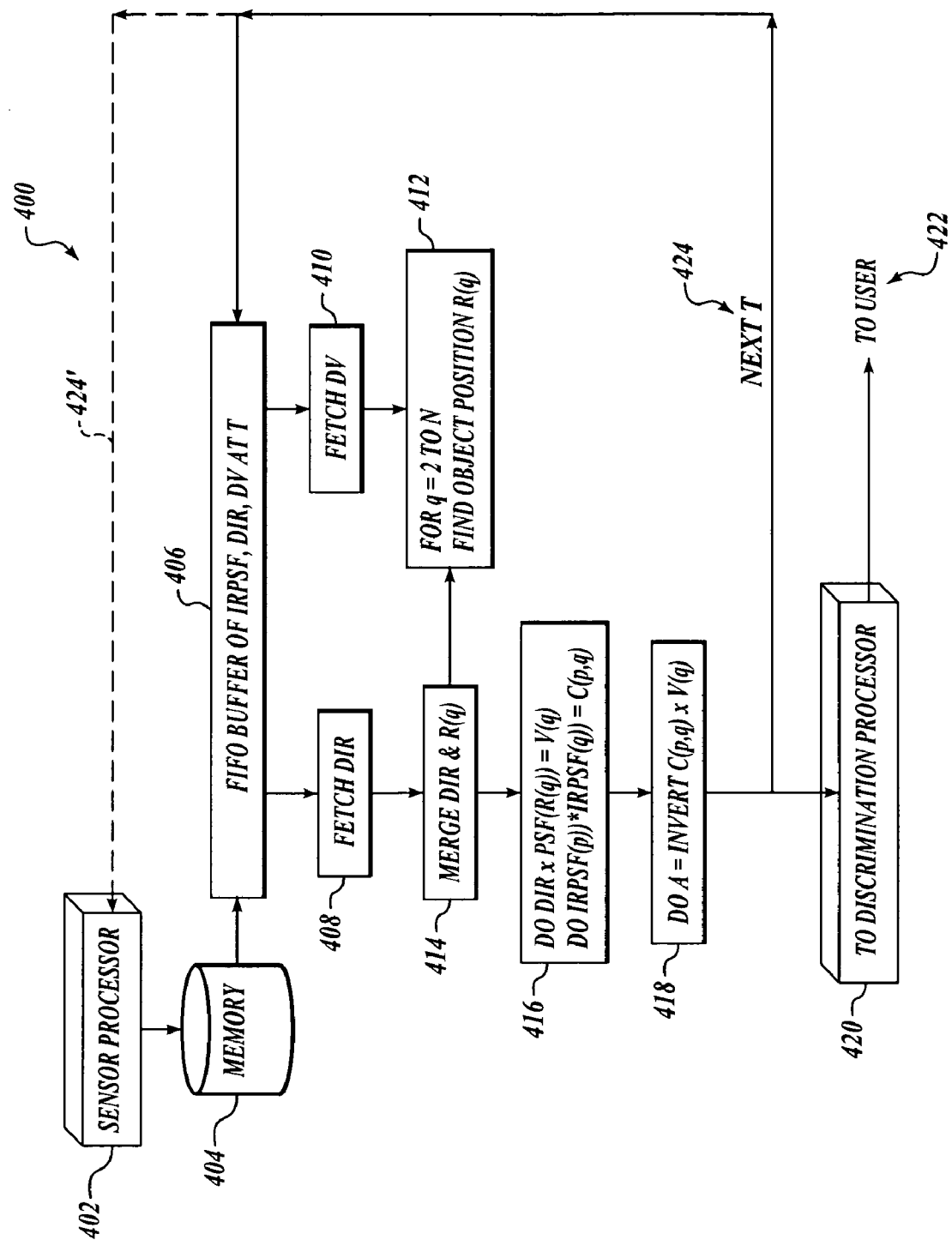
FIG. 4 is a schematic view of a process for resolving an infrared waveform of N closely-spaced objects in accordance with another embodiment of the present invention.

FIG. 4 is a schematic view of a process 400 for resolving an infrared waveform 156 of N closely-spaced objects 112 in accordance with another embodiment of the present invention. In this embodiment, the process 400 includes receiving the unresolved infrared waveform 156 within the sensor 102 at a block 402. The infrared waveform 156 may then be transmitted to a memory device at a block 404. At a block 406, the infrared waveform 156 (designated DIR in FIG. 4) is received by a first-in-first-out (FIFO) buffer. The FIFO buffer may also contain an infrared point spread function IRPSF, a data image of spatially resolved objects (e.g. visible objects) DV, and a time value T. The process 400 may further include fetching (or transmitting) the infrared waveform DIR for manipulation at a block 408, and similarly, fetching (or transmitting) the data image of spatially resolved objects DV for manipulation at a block 410.

In the embodiment shown in FIG. 4, at a block 412, the angular positions R(q) of each of the objects q of the N=2 to N closely-spaced objects 112 are obtained. The angular positions R(q) may be obtained, for example, directly from the appropriate visible sensor 102, or by any other suitable method, as described more fully below. At a block 414, the infrared waveform DIR is merged with the angular positions R(q) of the closely-spaced object 112. The process 400 then computes the infrared object vector V(q) by multiplying the data image of closely-spaced infrared objects DIR by the point spread function IRPSF(q) centered at position q, and also computes the values within the N×N Object Correlation Matrix C of inter-object p,q overlaps by multiplying IRPSF (P)×IRPSF(q) and integrating over the image field, at a block 416. Next, at a block 418, the vector of infrared object amplitudes A(q) is computed by multiplying the inverse of the Object Correlation Matrix C(p,q) by the infrared object vector V(q). The infrared object amplitudes A(q) may then be output to a discrimination processor at a block 420, and to a user at a block 422, for further analysis or manipulation. The process 400 may then repeat one or more of the operations set forth in blocks 402 through 418 for a next time increment T, for example, via a loop 424 which returns to block 406 (e.g. for performing another resolution of infrared amplitudes using the same unresolved infrared image at the same time T), or via an alternate loop 424' which returns to block 402 (e.g. for resolving the infrared amplitudes of a new unresolved infrared image at a different time T), or any other suitable looping path.

Embodiments of methods and apparatus in accordance with the present invention may advantageously resolve an infrared waveform of N closely-spaced objects in a direct, non-iterative computational process. By employing an analytical relationship that maps the infrared amplitudes A as a function of the position centroids of the N closely-spaced objects 112, the number of unknowns in the set of N simultaneous equations may be reduced. This may enable the N unknown infrared amplitudes A to be calculated using a direct, non-iterative process when the object positions are known, for example, from a collateral visible sensor. In addition, no estimates of the initial infrared object amplitudes are required because the point spread function may be a predetermined property of the sensor. Embodiments of apparatus and methods in accordance with the present invention may therefore provide improved computational efficiency compared with the prior art.

Furthermore, since computational efficiency may be substantially improved, the resolution of infrared amplitudes of closely-spaced objects may be performed more quickly compared with prior art methods. This may be a significant advantage in the context virtually any time-critical application which performs resolution of infrared amplitudes of closely-spaced objects. Embodiments of apparatus and methods in accordance with the present invention may also allow airborne and space-based systems to operate on an improved signal processing algorithm as opposed to a larger infrared telescope approach. Since sensor payload can be a significant factor in the cost of such systems, particularly space-based systems, the present invention may significantly reduce the size, weight, and costs associated with such systems.

In alternate embodiments, methods and apparatus in accordance with the present invention may be conceived which do not rely on a collateral visible sensor (or a sensor 102 having a non-infrared position sensing portion) to provide object position centroids. In such alternate embodiments, the position centroids may be determined through alternate means and may be used in embodiments of processes similar to the process 400 described above with reference to FIG. 4. In one alternate embodiment, for example, an iterative solution process may be developed in which the position centroids may be calculated based on Equation (1) above, and an iterative solution of both the position centroids and infrared amplitudes may be performed. In other words, the position centroids may be estimated, then the infrared amplitudes may be estimated, and then the position centroids updated based on the estimated infrared amplitudes, and the process repeated until a solution is converged.

Figure 5:
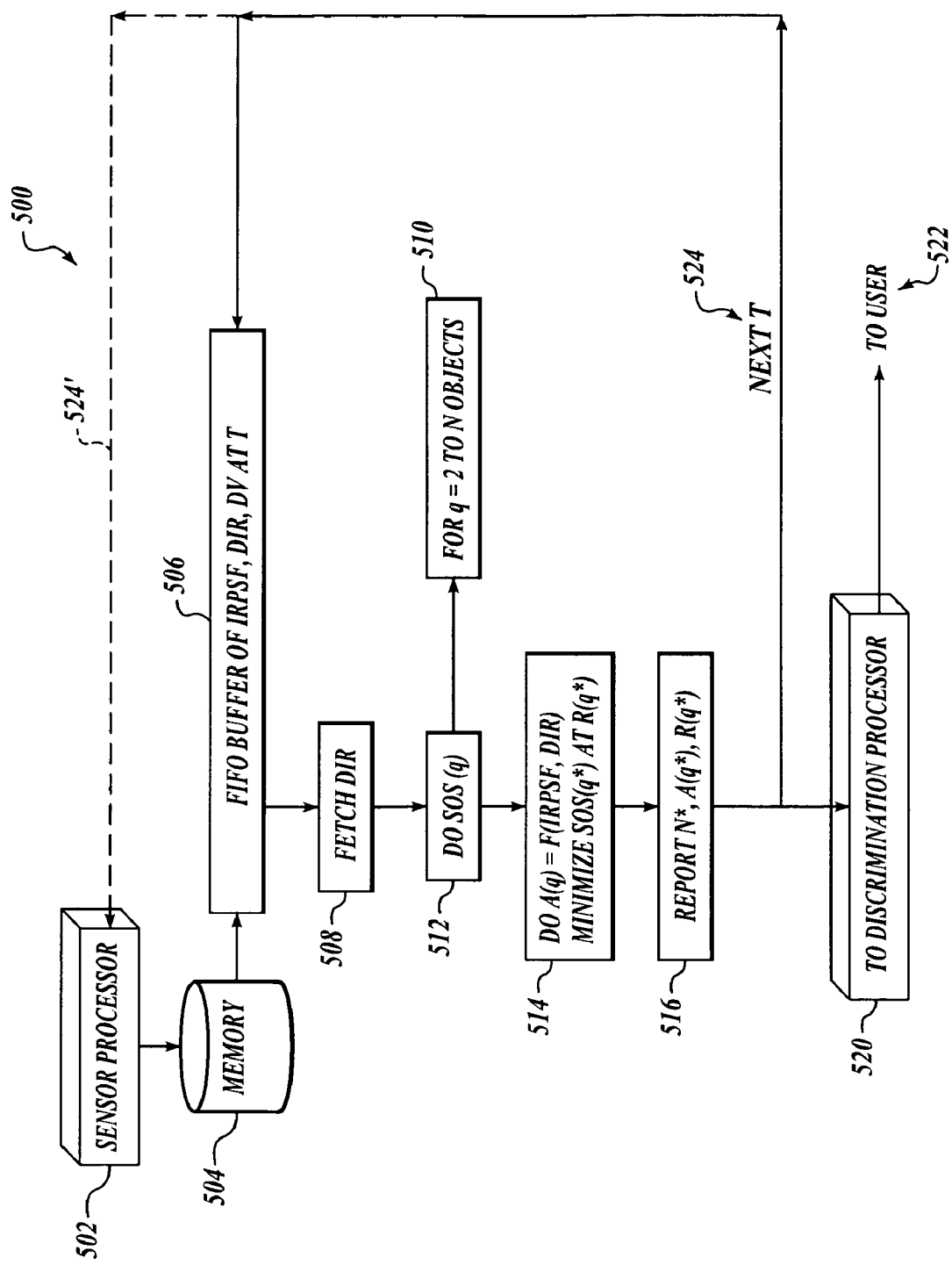
FIG. 5 is a schematic view of a process for resolving an infrared waveform of N closely-spaced objects in accordance with still another embodiment of the present invention.

For example, FIG. 5 is a schematic view of a process 500 for resolving an infrared waveform 156 of N closely-spaced objects 112 in accordance with yet another embodiment of the present invention. In this embodiment, the process 500 includes receiving the unresolved infrared waveform 156 within the sensor 102 at a block 502. The infrared waveform 156 may then be transmitted to a memory device at a block 504. At a block 506, the infrared waveform DIR is received by a FIFO buffer. The FIFO buffer may also contain an infrared point spread function IRPSF and a time value T. The process 500 includes fetching (or transmitting) the infrared waveform DIR for manipulation at a block 508.

Using an assumed initial condition, the number of objects N and the object positions R(q*) are iteratively determined at a block 510, and the sum of squared residuals SOS(q) is computed at a block 512. At a block 514, the infrared amplitudes A(q) are determined as a function f of the infrared point spread function IRPSF and the data image of closely-spaced infrared objects DIR. As further shown in FIG. 5, in this embodiment at block 514, the process 500 also minimizes the sum of squared residuals SOS(q*) at the angular position R(q*), where q* represents the object index for the N* object vector. In one aspect, at the correct R(q*), the data residuals between the closely-spaced object blob image and the model of the blob is a minimum set by the noise variance.

As will be appreciated, in the method 500, it is necessary to iterate to find the correct number of objects N* and their positions R(q*) because this information in not initially provided by a visible sensor or other suitable means. In the embodiment shown in FIG. 5, the iteration loop is the FOR q loop (block 514) which iterates what is the proper number of objects N to minimize SOS. In FIG. 5, the superscript * is used to differentiate the respective variables (e.g. q, N, etc.) from the corresponding variables of the method 400 shown in FIG. 4. More specifically, the superscript * indicates that the respective variables are determined without the benefit of the object positions R(q) having been previously determined or provided by a separate source (e.g. by a position sensor), but rather, the number of objects N and their object positions R(q*) are iteratively determined at the block 510 as described above.

At a block 516, the values of N*, A(q*), and R(q*) are output. Here A(q*) and R(q*) are the amplitudes and positions of the objects. These data may then be output to a discrimination processor at a block 520, and to a user at a block 522, for further analysis or manipulation. The process 500 may then repeat one or more of the operations set forth in blocks 502 through 516 for a next time increment T, for example, via a loop 524 which returns to block 506, or via an alternate loop 524' which returns to block 502, or any other suitable looping path.

Thus, apparatus and methods in accordance with alternate embodiments may be implemented which do not rely on a collateral position sensor (or a sensor 102 having a non-infrared position sensing portion) to provide object position centroids. In some embodiments, for example, the object centroids may be estimated by minimizing the sum of squared residuals SOS at R(q*) for N* closely-spaced objects 112. In such alternate embodiments, substantial reduction in the computational resources necessary for the estimation of closely-spaced object parameters (infrared amplitude, azimuth angle $\emptyset_x$, and elevation angle $\emptyset_y$) may still be achieved, although the improvements in computational efficiency and speed may not be as substantial as may be achieved having position centroid information from a collateral position sensor and using a direct solution process as described above. For example, in a particular embodiment, a process 500 as shown in FIG. 5 may exhibit a 33% reduction in the estimation of closely-spaced object parameters in comparison with alternate, prior art methods.

It will be appreciated that a wide variety of apparatus may be conceived that are adapted to resolve infrared amplitudes of closely-spaced objects in accordance with various embodiments of the present invention. For example, FIG. 1 shows an isometric view of an aircraft 104 having an optical sensor 102 that operates in accordance with an embodiment of the present invention. In general, except for the methods and apparatus for resolving infrared amplitudes of closely-spaced objects in accordance with various embodiments of the present invention, the various components and subsystems of the aircraft 104 may be of known construction and, for the sake of brevity, will not be described in detail herein.

As shown in FIG. 1, the aircraft 104 includes one or more propulsion units 172 coupled to a fuselage 174, a pair of wing assemblies 176, a tail assembly 178, a control system 180 (not visible), and a host of other systems and subsystems that enable proper operation of the aircraft 104. The aircraft 104 shown in FIG. 1 is generally representative of a military fighter aircraft, such as without limitation, an F/A-18E Super Hornet manufactured by The Boeing Company. The aircraft 104 may, however, be any other type of aerospace vehicle configuration, including, for example, the 737, 747, 757, 767, and 777 commercial aircraft models available from The Boeing Company. The inventive apparatus and methods disclosed herein, however, may also be employed in any other types of aircraft, such as rotary aircraft, unmanned aircraft, and missiles, including those described, for example, in The Illustrated Encyclopedia of Military Aircraft by Enzo Angelucci, published by Book Sales Publishers, September 2001, incorporated herein by reference. Alternately, embodiments of the present invention may be deployed on satellites or spacecraft, including those generally disclosed, for example, within the National Space Science Data Center Master Catalog published by the NASA Goddard Space Flight Center and incorporated herein by reference, or any other suitable platform.

Figure 6:
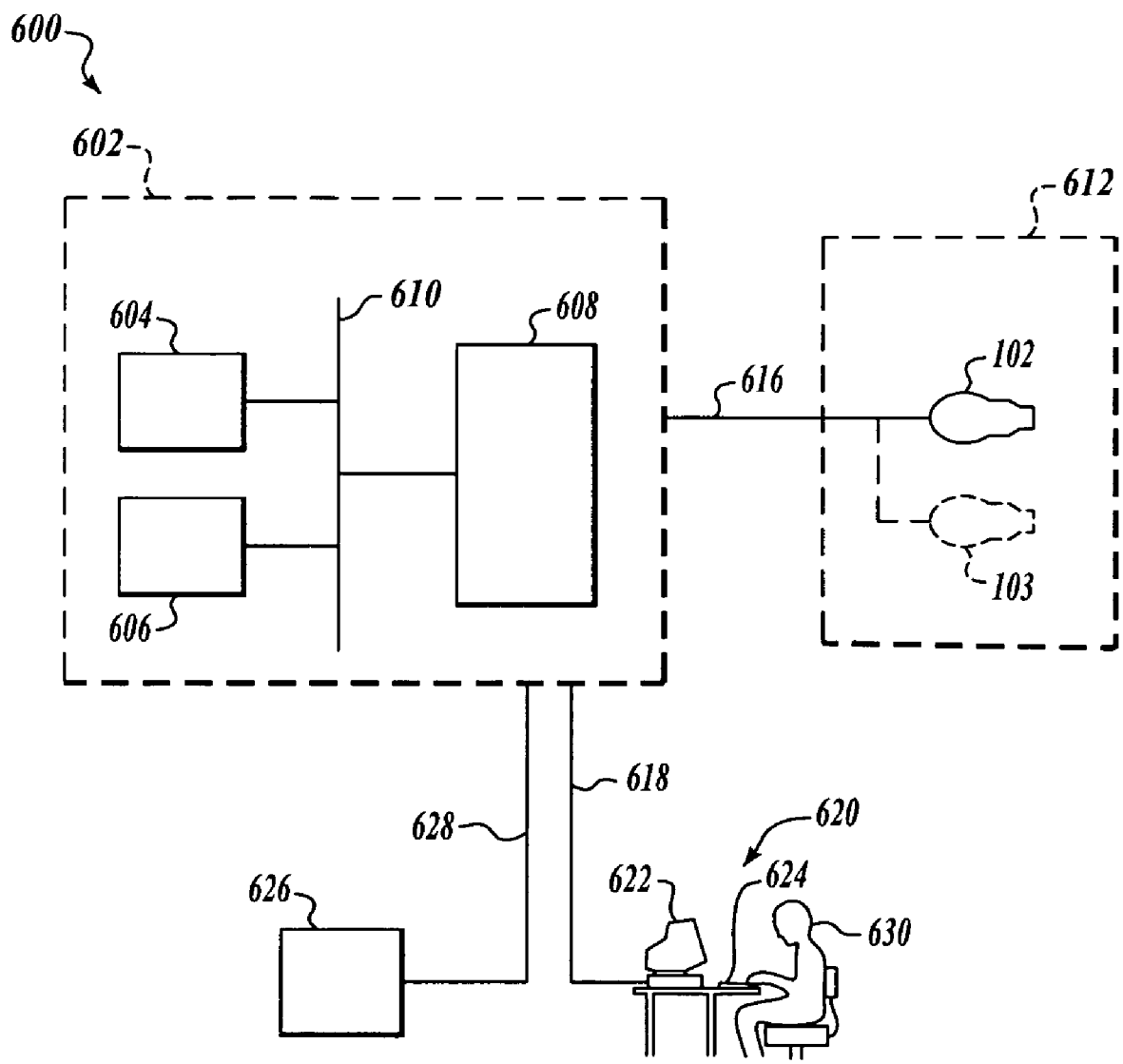
FIG. 6 is a system for detecting and resolving infrared amplitudes of closely-spaced objects in accordance with an embodiment of the invention.

More specifically, FIG. 6 is a system 600 for detecting and resolving infrared amplitudes of closely-spaced objects in accordance with an embodiment of the invention. As shown in FIG. 6, in this embodiment, the system 600 includes a computer 602 having a central processing unit (CPU) 604 and a memory component 606. The memory component 606 may include one or more memory modules, such as Random Access Memory (RAM) modules, Read Only Memory (ROM) modules, Dynamic Random Access Memory (DRAM) modules, and any other suitable memory modules. The computer 602 also includes an input/output (I/O) component 608 that may include a variety of known I/O devices, including network connections, video and graphics cards, disk drives or other computer-readable media drives, displays, or any other suitable I/O modules. A data bus 610 operatively couples the CPU 604, the memory component 606, and the I/O component 608.

It will be appreciated that the CPU 604 may be any suitable type of processor, including, for example, a General Purpose Microprocessor (GPM) (e.g. work stations), a Digital Signal Processor (DSP) (e.g. board-level chips with possibly reduced instruction sets but higher speed engines), Field Programmable Gate Arrays (FPGAs) (e.g. transistor gate level "computers" typically having more primitive micro software, but higher speeds than DSP), and ASIC silicon computers. In some applications, including, for example, military applications, the CPU 604 may be selected to provide real-time processing solutions, however, in other applications, non-real time solutions may be acceptable (e.g. research applications).

The system 600 embodiment shown in FIG. 6 further includes a data acquisition component 612 operatively coupled to the computer 602. In this embodiment, the data acquisition component 612 includes a sensor 102 operatively positioned to detect and receive an unresolved infrared image of the plurality of closely-spaced objects 112 (FIG. 1). The sensor 102 may be capable of acquiring both infrared data and non-infrared position data, as described above. Alternately, the sensor 102 may be an infrared sensor, and a separate non-infrared position sensor 103 may be provided. The data acquisition component 612 is operatively coupled to the computer 602 via a first communication link 616.

As further shown in FIG. 6, the system 600 may further include a control component 620 having a monitor 622 and a command input device 624 (e.g. a keyboard, an audio-visual input device, etc.). A second communication link 618 operatively couples the control component 620 to the computer 602. The system 600 may also include an auxiliary output device 626 coupled to the computer 602 by a third communication link 628. The auxiliary output device 626 may include, for example, a printer, a compact disk (CD) burner, a storage device, a communication port, or any other desired output device.

In one aspect, a machine-readable medium may be used to store a set of machine-readable instructions (e.g. a computer program) into the computer 602, wherein the machine-readable instructions embody a method of resolving infrared amplitudes of a plurality of closely-spaced objects in accordance with an embodiment of the present invention. The machine-readable medium may be any type of medium which can store data that is readable by the computer 602, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the system 600, including, for example, the I/O component 608, the memory component 606, and the auxiliary output device 626. Alternately, the machine-readable instructions may be implemented directly into one or more components of the computer 602, without the assistance of the machine-readable medium.

In operation, the system 600 may be partially or entirely implemented on a suitable platform. For example, in one representative embodiment, the data acquisition component 612 may be positioned on the platform, such as the aircraft 104 shown in FIG. 1, and the remaining portions of the system 600 may be remotely positioned at a separate location, such as a ground-based location. The data acquisition component 612 may then be trained onto a target cloud 110. The computer 602 may be configured to perform one or more of the aspects of the methods of resolving infrared images described above. For example, an operator 630 (either on the platform or remotely located) may input a command through the command input device 624 to cause the data acquisition component 612 to obtain one or more unresolved infrared images and object position data (FIG. 1). Alternately, the system 600 may be adapted to operate automatically and the operator 630 may be eliminated. The image data may then be communicated from the data acquisition component 612 to the computer 602. The computer 602 may be configured to perform the methods of resolving the infrared amplitudes of the plurality of closely-spaced objects contained within the image data. For example, a set of software instructions may be stored in the computer 602 (e.g. in the memory component 606) that causes the test data sets to be read into the memory component 606 and processed using the CPU 604 in accordance with one or more embodiments of the present invention described above with respect to FIGS. 1-5. Alternately, one or more aspects of the various processes described above may be implemented in the computer 602 using any suitable programmable or semi-programmable hardware components (e.g. EPROM components).

Results of the analysis in accordance with one or more embodiments of the present invention may be transmitted via the data bus 610 to the I/O component 608. The results may also be transmitted to the control component 620 and to the auxiliary output device 626 via the second and third communications links 618 and 628. The operator 630 may view the results of the analysis method(s) on the control monitor 622, and may take appropriate action, including revising analysis parameters and inputs, and continuing or repeating the one or more embodiments of analysis methods using different test data as desired. Alternately, the results of the analysis may be transmitted to auxiliary output device 626 for further analysis and processing (e.g. to a target and decoy discrimination process 164 as shown in FIG. 1).

It will be appreciated that the system 600 is one representative embodiment, and that a variety of alternate embodiments of systems may be conceived that operate in accordance with the present invention. In one alternate embodiment, for example, a system may include a grating device configured with a telescope to view a closely-spaced infrared object cluster, including the systems generally disclosed, for example, in co-pending, commonly-owned U.S. patent application Ser. No. 10/289,633 entitled "Hyperspectral Imager" filed on Nov. 7, 2002, which application is incorporated herein by reference. In further embodiments of systems in accordance with the invention, visible and infrared imagery data from non-grating devices such as dispersive prisms, interference filters, Fourier spectrometers, and any other suitable non-grating devices may be suitably employed.

Figure 7:
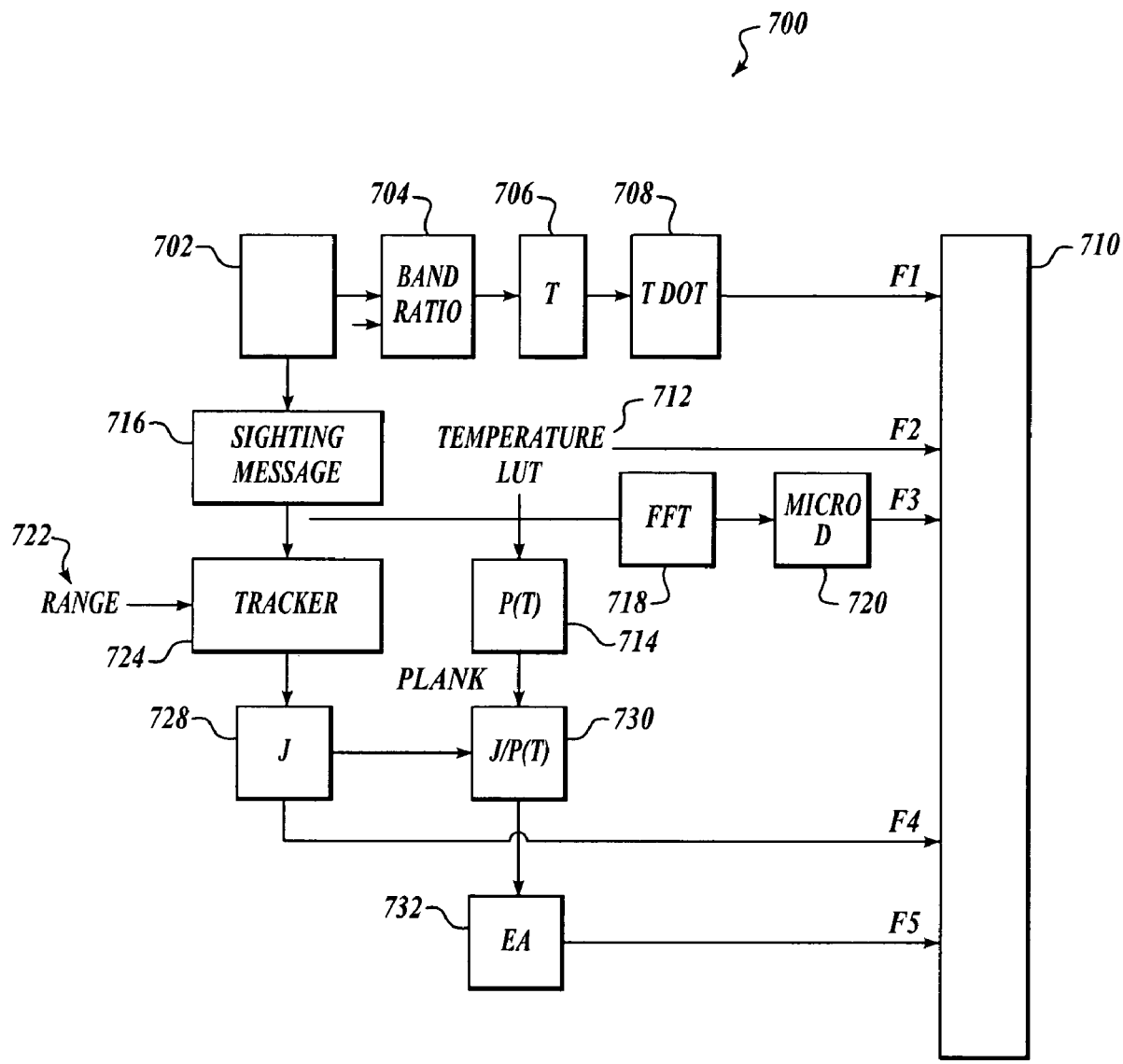
FIG. 7 is a schematic view of an application process in accordance with still another embodiment of the invention.

As previously indicated, the object amplitudes A(q) calculated using apparatus and methods in accordance with embodiments of the present invention may be useful in a variety of fields, including but not limited to, observational astronomy, medical and military applications, biomedical research, and other suitable fields of use. For example, FIG. 7 is a schematic view of an application process 700 in accordance with still another embodiment of the invention. In this embodiment, the application process 700 may include an amplitude determination process at a block 702 that determines the infrared object amplitudes A(q) of a group of N closely-spaced objects 112. The amplitude determination process (block 702) may include, for example, the process 400 described above with respect to FIG. 4, the process 500 described above with respect to FIG. 5 (which also iteratively computes the number of objects N* and the positions R(q*) thereof), or alternately, may include other processes in accordance with alternate embodiments of the present invention.

As shown in FIG. 7, one or more of the results of the amplitude determination process (block 702) may be transmitted to a band ratio analyzer at a block 704, which in turn may calculate a temperature T of one or more of the closely-spaced objects at a block 706. A time rate of change (T dot) of the one or more object temperatures T may be may then be computed at a block 708, which may in turn be transmitted to as a first input F1 to an information feature fuser at a block 710.

With continued reference to FIG. 7, the one or more temperatures T from the block 706 may be passed to a temperature LUT analyzer at a block 712, which in turn may provide a second input F2 to the information feature fuser (block 710), and to a Planck analyzer P(T) which further analyzes the temperatures T to determine additional characteristics of the objects at a block 714. Similarly, the results of the amplitude determination process at the block 702 may also be output to an alert indicator at a block 716, which may, for example, provide a sighting message or other type of alert. Next, at a block 718, a frequency analysis may be performed on the infrared amplitudes (A) (e.g. a Fast-Fourier Transform FFT analysis) at a block 718. Then, a micro-dynamics analysis may be performed at a block 720, the results of which may be provided as a third input F3 to the information feature fuser (block 710).

Using independently-provided range data 722, a tracking process of the N closely-spaced objects 112 may be performed at a block 724. At a block 726, a calculation of a set of multi-band radiant intensities J of the closely-spaced objects 112 may be performed at a block 728, and provided as a fourth input F4 to the information feature fuser (block 710). The multi-band radiant intensities J may be combined with the output of the Planck analyzer P(T) at a block 730, and provided to an emissivity analyzer at a block 732 to determine a set of emissivity areas EA. The output of the emissivity analyzer (block 732) may be provided as a fifth input F5 to the information feature fuser (block 710).

It will be appreciated that the application process 700 is one representative embodiment of an application process, and that the process 700 may be varied from the embodiment shown in FIG. 7. Accordingly, a wide variety of application processes may be conceived which utilize infrared amplitude determination methods and apparatus in accordance with embodiments of the present invention.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of determining a set of infrared amplitudes for a set of closely-spaced objects, comprising:
   receiving an unresolved infrared image of the set of closely-spaced objects;
   expressing the set of infrared amplitudes as a function of a set of positions of the closely-spaced objects;
   formulating a set of simultaneous equations at least partially based on the expression between the infrared amplitudes and the set of positions of the closely-spaced objects; and
   solving the set of simultaneous equations for the set of infrared amplitudes.

2. The method of claim 1, wherein expressing the set of infrared amplitudes as a function of a set of positions of the closely-spaced objects includes expressing the set of infrared amplitudes as a function of a set of positions provided by a non-infrared position sensor.

3. The method of claim 2, wherein the set of positions provided by a non-infrared position sensor include a set of positions provided by a position sensor operating in a visible electromagnetic wavelength.

4. The method of claim 2, wherein expressing the set of infrared amplitudes as a function of a set of positions of the closely-spaced objects includes expressing the set of infrared amplitudes as a function of a set of positions provided by a non-infrared position sensor operating through a common aperture with an infrared sensor that receives the unresolved infrared image of the set of closely-spaced objects.

5. The method of claim 1, wherein expressing the set of infrared amplitudes as a function of a set of positions of the closely-spaced objects includes expressing the set of infrared amplitudes as a function of a set of iteratively-derived object positions.

6. The method of claim 1, wherein expressing the set of infrared amplitudes as a function of a set of positions of the closely-spaced objects includes expressing the set of infrared amplitudes as a function of the closely-spaced objects based on a calculus of variation technique.

7. The method of claim 1, wherein expressing the set of infrared amplitudes as a function of a set of positions of the closely-spaced objects includes expressing the set of infrared amplitudes as a function of a point spread function of a sensor.

8. The method of claim 7, wherein expressing the set of infrared amplitudes as a function of a point spread function includes expressing the set of infrared amplitudes as a Gaussian fit.

9. The method of claim 7, wherein expressing the set of infrared amplitudes as a function of a point spread function includes expressing the set of infrared amplitudes as a Bessel blur spot model.

10. The method of claim 1, wherein expressing the set of infrared amplitudes as a function of a set of positions of the closely-spaced objects includes:
    formulating an object correlation matrix from the set of positions;
    formulating a vector of weighted raw data; and
    expressing the set of infrared amplitudes as the product of the vector of weighted raw data times the inverse of the object correlation matrix.

11. The method of claim 10, wherein formulating an object correlation matrix includes calculating an overlap integral for each object pair of the set of closely-spaced objects.

12. The method of claim 10, wherein formulating an object correlation matrix includes
    obtaining the position locations of each of the closely-spaced objects;
    calculating a point spread function for each of the closely-spaced objects; and
    calculating an overlap integral for each object pair of the set of closely-spaced objects, the overlap integral being the product of a first point spread function evaluated for a first object of the object pair and a second point spread function evaluated for a second object of the object pair.

13. The method of claim 12, wherein obtaining the position locations of each of the closely-spaced objects includes obtaining the position locations of each of the closely-spaced objects using a non-infrared position sensor.

14. The method of claim 12, wherein obtaining the position locations of each of the closely-spaced objects includes obtaining the position locations of each of the closely-spaced objects using a non-infrared position sensor operating through a common aperture with an infrared sensor that receives the unresolved infrared image of the set of closely-spaced objects.

15. The method of claim 12, wherein obtaining the position locations of each of the closely-spaced objects includes iteratively estimating the position locations of each of the closely-spaced objects.

16. The method of claim 12, wherein obtaining a point spread function for each of the closely-spaced objects includes calculating a point spread function for each of the closely-spaced objects based on a Gaussian fit.

17. The method of claim 12, wherein calculating a point spread function for each of the closely-spaced objects includes calculating a point spread function for each of the closely-spaced objects based on a Bessel blur spot model.

18. The method of claim 1, wherein formulating a set of simultaneous equations includes minimizing a sum of squared residuals formed by differencing and squaring the unresolved waveform with a closely-spaced object model of N unconstrained object waveforms.

19. The method of claim 1, wherein solving the set of simultaneous equations for the set of infrared amplitudes includes solving the set of simultaneous equations for the set of infrared amplitudes in a direct, non-iterative manner.

20. The method of claim 1, wherein solving the set of simultaneous equations for the set of infrared amplitudes includes solving the set of simultaneous equations for the set of infrared amplitudes in an iterative manner that includes iteratively solving for the set of positions of the closely-spaced objects.

21. The method of claim 1, wherein expressing the set of infrared amplitudes as a function of a set of positions includes expressing the set of infrared amplitudes as a function of a set of positions wherein at least some of the closely-spaced objects are at least partially overlapping.

22. The method of claim 1, wherein expressing the set of infrared amplitudes as a function of a set of positions includes expressing the set of infrared amplitudes as a function of a set of positions wherein at least some of the closely-spaced objects are non-overlapping.

23. The method of claim 1, further comprising performing an additional action based on the set of infrared amplitudes.

24. The method of claim 23, wherein performing an additional action based on the set of infrared amplitudes includes computing one or more temperatures of at least some of the closely-spaced objects.

25. The method of claim 23, wherein performing an additional action based on the set of infrared amplitudes includes computing one or more time rate of temperature change values of at least some of the closely-spaced objects.

26. The method of claim 23, wherein performing an additional action based on the set of infrared amplitudes includes providing an alert indicator regarding at least some of the closely-spaced objects.

27. The method of claim 23, wherein performing an additional action based on the set of infrared amplitudes includes performing a frequency analysis of at least some of the closely-spaced objects.

28. The method of claim 23, wherein performing an additional action based on the set of infrared amplitudes includes performing a micro-dynamics analysis of at least some of the closely-spaced objects.

29. The method of claim 23, wherein performing an additional action based on the set of infrared amplitudes includes performing a radiant intensity analysis of at least some of the closely-spaced objects.

30. The method of claim 23, wherein performing an additional action based on the set of infrared amplitudes includes inputting a range value, and computing an emissivity area of at least some of the closely-spaced objects.

31. The method of claim 1, wherein receiving an unresolved infrared image of the set of closely-spaced objects includes receiving an unresolved infrared image via an imaging system, wherein the imaging system includes a grating device.

32. The method of claim 1, wherein receiving an unresolved infrared image of the set of closely-spaced objects includes receiving an unresolved infrared image via an imaging system, wherein the imaging system includes a grating device configured with a telescope adapted to view a closely-spaced infrared object cluster.

33. A computer-readable media embodied with computer executable instructions that when executed, perform a method of resolving a set of infrared amplitudes of a plurality of closely-spaced objects, comprising:
a first computer program portion adapted to receive an unresolved infrared image of the set of closely-spaced objects;
a second computer program portion adapted to express the set of infrared amplitudes as a function of a set of positions of the closely-spaced objects;
a third computer program portion adapted to formulate a set of simultaneous equations at least partially based on the expression between the infrared amplitudes and the set of positions of the closely-spaced objects; and
a fourth computer program portion adapted to solve the set of simultaneous equations for the set of infrared amplitudes.

34. The computer-readable media of claim 33, wherein the second computer program portion is adapted to express the set of infrared amplitudes as a function of a set of positions provided by a non-infrared position sensor.

35. The computer-readable media of claim 33, wherein the second computer program portion is adapted to express the set of infrared amplitudes as a function of a set of positions provided by a non-infrared position sensor operating through a common aperture with an infrared sensor that receives the unresolved infrared image of the set of closely-spaced objects.

36. The computer-readable media of claim 33, wherein the second computer program portion is adapted to express the set of infrared amplitudes as a function of a set of iteratively-derived object positions.

37. The computer-readable media of claim 33, wherein the second computer program portion is adapted to express the set of infrared amplitudes as a function of a point spread function of a sensor.

38. The computer-readable media of claim 33, wherein the second computer program portion is adapted to express the set of infrared amplitudes as a function of a set of positions by:
formulating an object correlation matrix from the set of positions;
formulating a vector of weighted raw data; and
expressing the set of infrared amplitudes as the product of the vector of weighted raw data times the inverse of the object correlation matrix.

39. The computer-readable media of claim 38, wherein formulating an object correlation matrix includes calculating an overlap integral for each object pair of the set of closely-spaced objects.

40. The computer-readable media of claim 38, wherein formulating an object correlation matrix includes
obtaining the position locations of each of the closely-spaced objects;
calculating a point spread function for each of the closely-spaced objects; and
calculating an overlap integral for each object pair of the set of closely-spaced objects, the overlap integral being the product of a first point spread function evaluated for a first object of the object pair and a second point spread function evaluated for a second object of the object pair.

41. The computer-readable media of claim 33, wherein the third computer program portion is adapted to formulate a set of simultaneous equations by minimizing a sum of squared residuals formed by differencing and squaring the unresolved waveform with a closely-spaced object model of N unconstrained object waveforms.

42. The computer-readable media of claim 33, wherein the fourth computer program portion is adapted to solve the set of simultaneous equations for the set of infrared amplitudes in a direct, non-iterative manner.

43. The computer-readable media of claim 33, wherein the fourth computer program portion is adapted to solve the set of simultaneous equations for the set of infrared amplitudes in an iterative manner that includes iteratively solving for the set of positions of the closely-spaced objects.

44. The computer-readable media of claim 33, wherein the second computer program portion is adapted to express the set of infrared amplitudes as a function of a set of positions, wherein at least some of the closely-spaced objects are at least partially overlapping.

45. The computer-readable media of claim 33, wherein the second computer program portion is adapted to express the set of infrared amplitudes as a function of a set of positions, wherein at least some of the closely-spaced objects are non-overlapping.

46. The computer-readable media of claim 33, further comprising a fifth computer program portion adapted to perform an additional action based on the set of infrared amplitudes.

47. The computer-readable media of claim 46, wherein the fifth computer program portion is adapted to compute one or more temperatures of at least some of the closely-spaced objects.

48. The computer-readable media of claim 33, wherein the first computer program portion is adapted to receive an unresolved infrared image of the set of closely-spaced objects includes receiving an unresolved infrared image via an imaging system, wherein the imaging system includes a grating device.

49. The computer-readable media of claim 33, wherein the first computer program portion is adapted to receive an unresolved infrared image of the set of closely-spaced objects includes receiving an unresolved infrared image via an imaging system, wherein the imaging system includes a grating device configured with a telescope adapted to view a closely-spaced infrared object cluster.

50. A sensor system for resolving a set of infrared amplitudes of a plurality of closely-spaced objects, comprising:
an infrared sensor adapted to receive an unresolved infrared image of the set of closely-spaced objects;
a data reduction system operatively coupled to the infrared sensor and including a processor and a memory device operatively coupled to the processor, wherein the data reduction system includes:
a first portion adapted to receive the unresolved infrared image of the set of closely-spaced objects from the infrared sensor;
a second portion adapted to express the set of infrared amplitudes as a function of a set of positions of the closely-spaced objects;
a third portion adapted to formulate a set of simultaneous equations at least partially based on the expression between the infrared amplitudes and the set of positions of the closely-spaced objects; and
a fourth portion adapted to solve the set of simultaneous equations for the set of infrared amplitudes.

51. The sensor system of claim 50, wherein the second portion is adapted to express the set of infrared amplitudes as a function of a set of positions provided by a non-infrared position sensor.

52. The sensor system of claim 50, wherein the second portion is adapted to express the set of infrared amplitudes as a function of a set of positions provided by a non-infrared position sensor operating through a common aperture with an infrared sensor that receives the unresolved infrared image of the set of closely-spaced objects.

53. The sensor system of claim 50, wherein the second portion is adapted to express the set of infrared amplitudes as a function of a set of iteratively-derived object positions.

54. The sensor system of claim 50, wherein the second portion is adapted to express the set of infrared amplitudes as a function of a point spread function of a sensor.

55. The sensor system of claim 50, wherein the second portion is adapted to express the set of infrared amplitudes as a function of a set of positions by:
formulating an object correlation matrix from the set of positions;
formulating a vector of weighted raw data; and
expressing the set of infrared amplitudes as the product of the vector of weighted raw data times the inverse of the object correlation matrix.

56. The sensor system of claim 55, wherein formulating an object correlation matrix includes calculating an overlap integral for each object pair of the set of closely-spaced objects.

57. The sensor system of claim 55, wherein formulating an object correlation matrix includes
obtaining the position locations of each of the closely-spaced objects;
calculating a point spread function for each of the closely-spaced objects; and
calculating an overlap integral for each object pair of the set of closely-spaced objects, the overlap integral being the product of a first point spread function evaluated for a first object of the object pair and a second point spread function evaluated for a second object of the object pair.

58. The sensor system of claim 50, wherein the third portion is adapted to formulate a set of simultaneous equations by minimizing a sum of squared residuals formed by differencing and squaring the unresolved waveform with a closely-spaced object model of N unconstrained object waveforms.

59. The sensor system of claim 50, wherein the fourth portion is adapted to solve the set of simultaneous equations for the set of infrared amplitudes in a direct, non-iterative manner.

60. The sensor system of claim 50, wherein the fourth portion is adapted to solve the set of simultaneous equations for the set of infrared amplitudes in an iterative manner that includes iteratively solving forte set of positions of the closely-spaced objects.

61. The sensor system of claim 50, wherein the second portion is adapted to express the set of infrared amplitudes as a function of a set of positions, wherein at least some of the closely-spaced objects are at least partially overlapping.

62. The sensor system of claim 50, wherein the second portion is adapted to express the set of infrared amplitudes as a function of a set of positions, wherein at least some of the closely-spaced objects are non-overlapping.

63. The sensor system of claim 50, wherein the data reduction system further comprises a fifth portion adapted to perform an additional action based on the set of infrared amplitudes.

64. The sensor system of claim 63, wherein the fifth portion is adapted to compute one or more temperatures of at least some of the closely-spaced objects.

65. The sensor system of claim 50, wherein the first portion is adapted to receive an unresolved infrared image of the set of closely-spaced objects includes receiving an unresolved infrared image via an imaging system, wherein the imaging system includes a grating device.

66. The sensor system of claim 50, wherein the first portion is adapted to receive an unresolved infrared image of the set of closely-spaced objects includes receiving an unresolved infrared image via an imaging system, wherein the imaging system includes a grating device configured with a telescope adapted to view a closely-spaced infrared object cluster.

67. A detection system for detecting and resolving infrared amplitudes of closely-spaced objects, comprising:
a platform;
a sensor system operatively coupled to the platform, the sensor system including:
an infrared sensor adapted to receive an unresolved infrared image of the set of closely-spaced objects;
a data reduction system operatively coupled to the infrared sensor and including a processor and a memory device operatively coupled to the processor, wherein the data reduction system includes:
a first portion adapted to receive the unresolved infrared image of the set of closely-spaced objects from the infrared sensor;
a second portion adapted to express the set of infrared amplitudes as a function of a set of positions of the closely-spaced objects;
a third portion adapted to formulate a set of simultaneous equations at least partially based on the expression between the infrared amplitudes and the set of positions of the closely-spaced objects; and a fourth portion adapted to solve the set of simultaneous equations for the set of infrared amplitudes.

68. The detection system of claim 67, wherein the platform includes an aircraft.

69. The detection system of claim 67, wherein the platform includes a space-based platform.

70. The detection system of claim 67, wherein the second portion is adapted to express the set of infrared amplitudes as a function of a point spread function of a sensor.

71. The detection system of claim 67, wherein the second portion is adapted to express the set of infrared amplitudes as a function of a set of positions by:

formulating an object correlation matrix from the set of positions;

formulating a vector of weighted raw data; and expressing the set of infrared amplitudes as the product of the vector of weighted raw data times the inverse of the object correlation matrix.

72. The detection system of claim 67, wherein the third portion is adapted to formulate a set of simultaneous equations by minimizing a sum of squared residuals formed by differencing and squaring the unresolved waveform with a closely-spaced object model of N unconstrained object waveforms.

73. The detection system of claim 67, wherein the fourth portion is adapted to solve the set of simultaneous equations for the set of infrared amplitudes in a direct, non-iterative manner.

74. The detection system of claim 67, wherein the fourth portion is adapted to solve the set of simultaneous equations for the set of infrared amplitudes in an iterative manner that includes iteratively solving for the set of positions of the closely-spaced objects.

75. The detection system of claim 67, wherein the second portion is adapted to express the set of infrared amplitudes as a function of a set of positions, wherein at least some of the closely-spaced objects are at least partially overlapping.

76. The detection system of claim 67, wherein the second portion is adapted to express the set of infrared amplitudes as a function of a set of positions, wherein at least some of the closely-spaced objects are non-overlapping.

77. The detection system of claim 67, wherein the data reduction system further comprises a fifth portion adapted to perform an additional action based on the set of infrared amplitudes.

78. The detection system of claim 77, wherein the fifth portion is adapted to compute one or more temperatures of at least some of the closely-spaced objects.

79. The detection system of claim 67, wherein the first portion is adapted to receive an unresolved infrared image of the set of closely-spaced objects includes receiving an unresolved infrared image via an imaging system, wherein the imaging system includes a grating device.

80. The sensor system of claim 67, wherein the first portion is adapted to receive an unresolved infrared image of the set of closely-spaced objects includes receiving an unresolved infrared image via an imaging system, wherein the imaging system includes a grating device configured with a telescope adapted to view a closely-spaced infrared object cluster.

* * * * *